Sept. 20, 1960  J. L. PARK, JR  2,952,877
METHOD OF MAKING CERAMIC INSULATORS
Filed Nov. 22, 1954
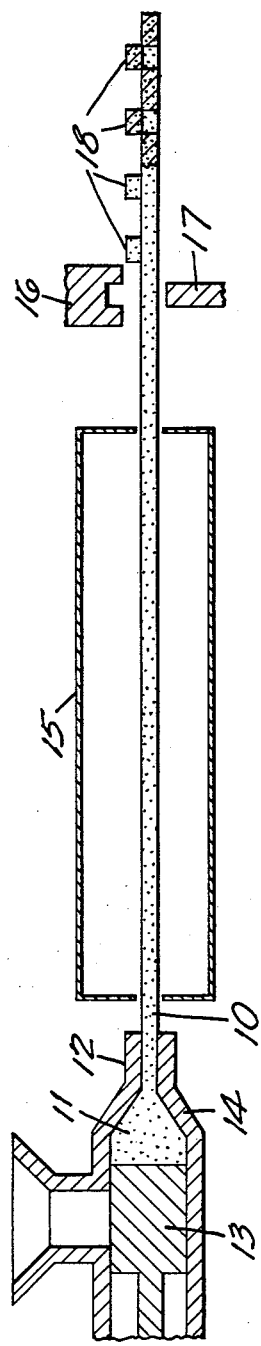
INVENTOR
JOHN LAWRENCE PARK, JR.
BY
Carpenter, Abbott, Coulter + Kinney
ATTORNEYS

United States Patent Office 2,952,877
Patented Sept. 20, 1960

2,952,877

METHOD OF MAKING CERAMIC INSULATORS

John Lawrence Park, Jr., Chattanooga, Tenn., assignor to American Lava Corporation, Chattanooga, Tenn., a corporation of Tennessee Filed Nov. 22, 1954, Ser. No. 470,545

12 Claims. (Cl. 18—47.5)

This invention relates to the manufacture of ceramic articles such as insulators, and has particular reference to novel and improved methods of manufacture and compositions employed therein.

Dried masses of pulverized ceramic raw materials held together by organic binders are very brittle and crack if an attempt is made to mold the same in a water-free condition. The retention of sufficient water in such masses to render them moldable is disadvantageous for the reason that little control can then be exercised over dimensional characteristics of fired end products because drying shrinkage cannot be predetermined accurately.

This invention, however, overcomes the aforementioned difficulties and provides a substantially automatic and continuous process for making ceramic articles which exhibit reliable dimensional characteristics, the process involving stamping the articles from a substantially water-free, flexible, self-supporting, ceramic-particulate slab or ribbon. The invention is particularly useful in making solid and perforated ceramic insulating spacers for vacuum tubes but may also be used in making other ceramic articles, e.g., dielectric plates or discs for capacitors, piezoelectric ceramics, support plates for printed circuits, etc.

The drawing illustrates in schematic section an extruded slab or ribbon of ceramic-particulate and a form of apparatus suitable for carrying out the process hereof.

In accordance with this invention a water-soluble polymeric organic binder and a water-soluble plasticizer therefor, both preferably volatilizable at temperatures above the boiling point of water, are mixed with the powdered inorganic ceramic-particulate materials and water until a uniform blend, i.e., a smooth homogenous plastic mixture, is obtained. The content of water, binder, and plasticizer is adjusted to form a heavy paste, i.e., a dough-like mix, which is then extruded under pressure to form a strip or slab. Thereafter the water content of the slab is substantially eliminated, that is reduced to not more than approximately ½% by weight. Individual articles are stamped out of the resulting substantially water-free, flexible, self-supporting slab in a substantially automatic and continuous manner and are either fired in a separate state or fired while they remain clinging to the main body of the extruded slab or strip. The plasticizer content in the extruded substantially water-free slab provides stampability without breakage, and in addition, permits accurate control of dimenisons in the fired articles, a result which has not heretofore been found possible with water.

The following is offered as a specific example to illustrate the novel composition of the heavy paste employed according to this invention:

*Table I*

| Ingredient | Parts by Weight | Percent by Weight |
|---|---|---|
| Aluminum Oxide | 90 | 74.10 |
| Talc (Hydrous Magnesium Silicate) | 3 | 2.47 |
| Silicon Dioxide | 4 | 3.28 |
| Betonite (a hydrous aluminum silicate) | 3 | 2.47 |
| Polyvinyl Alcohol (Polymeric Organic Binder) | 4.5 | 3.70 |
| Triethylene Glycol (Plasticizer) | 4 | 3.28 |
| Polyethylene glycol alkyl ether (wetting agent) | 1 | .82 |
| Water | 12 | 9.88 |
| Total | 121.5 | 100.00 |

The polyethylene glycol alkyl ether employed was obtained commercially under the trade name "Tergitol TMN" and is a surface active dispersing agent. It is opaque and heavily viscous at room temperature.

The inorganic constituents in the above table, i.e., the first four ingredients listed, may be varied according to the properties desired in any ceramic end product. In any particular extrusion paste, however, between approximately 70% and 85% by weight of the paste are inorganic constituents which, being in finely divided form and being at least sinterable during firing, may be termed ceramic-particulate. Examples of usable ceramic-particulate materials other than those listed are the oxides of titanium, zirconium, silicon, or combinations with alkali and alkaline earth oxides, etc. Fluxes such as phosphates, borides, etc., may be employed as desired. Modifying inorganic materials such as lead oxide, iron oxide, stannates, etc. may also be incorporated in the mix.

Inorganic constitutents of the extrusion paste are pulverized to a particle size on the order of approximately minus 200 mesh either before or during the mixing of the paste, a step which is set forth below. Smaller particle sizes, e.g., on the order of and smaller than minus 325 mesh, may be employed if desired (suitably in the manufacture of ceramic elements for capacitors) but are not necessary in the manufacture of ceramic vacuum tube spacers. Larger particle sizes are generally unsatisfactory for the reason that uniformity in the end product is lost.

The ingredients set forth in Table I other than the inorganic materials may be varied in concentration as follows:

*Table II*

Approximate allowable variation by percent of weight of extrusion paste

Polymeric organic binder _____ 1–6
Plasticizer _____ 2–10
Wetting agent _____ .01–2.0
Water _____ 8–25

Polyvinyl alcohol is a preferred water-soluble, volatilizable, polymeric organic binder but others suitable to employ are hide blue, alkali casein, dextrine, starch adhesives, etc. Certain acrylates such as water-soluble polyacrylic acid and polyacrylamide likewise may be employed. It may be noted that these binders are adhesive in nature.

Triethylene glycol is an excellent compatible, water-soluble, volatilizable, liquid plasticizer for polyvinyl alcohol as well as other polymeric organic binders aforementioned. It may be noted that on combining triethylene glycol and polyvinyl alcohol an exothermic effect ensues.

However, any suitable water-soluble liquid plasticizer which is compatible with the particular water-soluble polymeric organic binder which it plasticizes may be used in the practice of this invention. A compatible plasticizer is one which does not separate into a phase distinct from the polymeric organic binder for which it acts as a plasticizer. Diethylene glycol, propylene glycol and glycerine may also be used to plasticize polyvinyl alcohol, or may be used to plasticize other polymeric organic binders mentioned. Both the liquid plasticizer and the polymeric adhesive organic binder selected need not be completely water-soluble but must be at least uniformly dispersible in water. The term substantially water-soluble is intended to include this concept. The binder and plasticizer must not volatilize at temperatures equal to or below those at which water is removed from the extruded slab according to this invention. Preferably the plasticizer and binder volatilize only at temperature above the boiling point of water. If either is removed during the drying step, a loss of the required property of flexibility in the substantially water-free extruded slab occurs. The total amount of plasticizer and polymeric organic binder in an extrusion paste preferably is at least about 4% by weight of the paste in order that the dried extruded slab exhibit suitable flexibility as well as cohesiveness for subsequent procedural steps.

The wetting agent used in making the extrusion paste hereof functions to facilitate the formation of a uniform smooth paste. Other substantially water-soluble wetting agents than the one aforementioned are equally suitable to use in this function.

It will be noted from Table II that the quantity of water mixed with other ingredients of the extrudable mix may be varied from 8 to 25% depending upon the viscosity desired in the resulting paste. For extrusion pressures as low as around 200 p.s.i. the quantity of water is kept toward its upper limit; while for extrusion pressures around 8,000 p.s.i. the quantity of water is held toward its lower limit, i.e., 8% by weight. If the quantity of water and/or if the quantity of plasticized organic binder are raised toward their upper limits, as noted in Table II, the viscosity of the mix approaches approximately $1 \times 10^6$ poises. Conversely, if the amount of plasticized organic binder and/or if the amount of water in the ceramic-particulate mix are held toward their lower limits, as set forth in the aforementioned table, the viscosity of the resulting paste approaches $1 \times 10^{14}$ poises. Outside the aforementioned limits, extrusion is difficult and uniformity as well as strength in the extruded slab is lost.

In practicing this invention, the ingredients in Table I, or other suitable equivalents, are mixed together, suitably in a muller-type mixer, until a smooth homogeneous blend is obtained. Depending upon the specific amounts and the specific ingredients selected as the organic binder and the plasticizer, the water content will be varied to maintain a viscosity for the mix which is suitable to employ under particular extrusion conditions used. Water may be noted as a very efficient extrusion aid for the heavy pastes of this invention, and in addition, is easy to handle, economical, and non-inflammable. The specific example of the table was extruded to form a slab or strip under a pressure of 1,000 p.s.i. through an orifice of a cross section of 0.040″ × 1.25″. The extruded strip may suitably be supported, if desired, on a moving conveyor.

Referring to the drawing for illustration, strip 10 of a blended paste 11, containing ceramic-particulate, is extruded through an extrusion orifice 12 under pressure such as gained by using a piston 13 in the cylinder of extrusion apparatus 14.

It will readily be understood by those practicing this invention that the size and shape of an extrusion orifice may be varied considerably. For example, the orifice may be oval, circular, square, rectangular, etc. Preferably, however, an orifice size at least approximately 0.01″ in all dimensions or larger in one or more dimensions, is employed in order to obtain extruded strips of reasonable size and strength for subsequent procedural steps. Extruded strips of this invention are preferably in a sufficiently solid state so that they do not deform or sag before drying, and dry without tendency to form an external crust or sheath.

As soon as the paste is extruded, it is subjected to currents of hot air, preferably in a drying chamber. The extruded strip may be moved, if desired, at a predetermined rate on a conveyor through a drying chamber. Drying is accomplished desirably at air temperatures above the boiling point of water but the ceramic-particulate slab itself is not allowed during this step to exceed approximately 220° F. Higher temperatures in the slab cause a volatilization of some of the plasticized polymeric organic binder and a loss of flexiblity in the extruded slab. The temperature of the slab during drying is never allowed to rise so high as to cause volatilization of the binder and plasticizer. Drying at temperatures as low as 80° F. is slow but may be accomplished using low humidity conditions if desired. Drying is stopped when the water content of the slab is reduced to approximately ½% by weight which may in the usual case be determined by noting the point when the slab during the drying step tends to sharply rise in temperature. During drying the extruded slab changes from one plastic state, i.e., that with water, to another plastic state, i.e., that free of substantial amounts of water. The plasticity of the substantially water-free slab apparently arises from the plasticization of the adhesive binder. A high water content is not desired and is unnecessary to achieve this plasticization which imparts flexibility to the extruded strip of this invention. The flexible substantially water-free strip may at this point be wound upon itself and stored. Storage, however, must be under low humidity conditions in order to prevent the substantially dry strip from taking up water. If a stored strip takes up water, it must again be subjected to drying conditions.

Again referring to the drawing for illustration, strip 10 may be dried, as aforedescribed, by passing the same supported on a suitable conveyor (not shown) through drying chamber 15.

The flexible substantially water-free extruded strip or slab is then fed through automatic stamping machinery where unitary articles shaped as desired are stamped or punched directly from the flexible strip. Suitably, articles stamped from the strip may be stamped in such a manner as to remain clinging to the main body of the strip. This may be accomplished by using a stamping or punching die the co-acting edge or peripheral portions of which have a clearance on the order of approximately 0.0005″. In addition such a die preferably acts to displace the portion of the extruded strip within its confines, i.e., within the die, from the plane of the extruded strip proper to a plane immediately adjacent thereto. The resulting article stamped by the die remains clinging to the main body of the strip either by virtue of the adhesive action of the plasticized binder or by frictional forces and may conveniently be fired in this condition. After firing, the articles are separated from the strip. A particular advantage of stamping articles so that they remain clinging to the main body of the strip lies in the reduced handling necessary during subsequent steps in the manufacture of small ceramic articles. If desired, however, articles may be stamped or punched free from the strip and fired in a separate state.

In the illustrative drawing reciprocating stamping dies 16 and 17 cooperate to punch or stamp articles 18 from strip 10. The articles 18, some of which are illustrated in cross section through the center line of strip 10, are shown clinging to strip 10, and may be fired in this condition, as aforedescribed.

Because the articles are stamped from a substantially water-free strip, their dimensional characteristics are easily controlled during subsequent processing. This is especially striking when compared to the difficulties encountered with the dimensional characteristics of articles molded from strips having a comparatively high water content. This invention, however, not only provides this advantage but also the advantages inherent in the use of water as an extrusion aid.

The stamped articles are then fired to sintering or vitrification temperatures. Firing of articles stamped from the extruded slab formed from the paste set forth in Table I, or equivalent formulations, is suitably accomplished under pyrometric cone conditions between approximately 7 and 35 in any atmosphere. During firing the organic constituents are burned and volatilized from the stamped articles. The specific cone conditions used in firing stamped articles will vary depending upon the inorganic ingredients and the amount of vitrification or sintering desired.

Insulators made according to this invention have uniform properties and are uniform in density throughout all areas thereof. Insulators made from dried powdered ceramic-particulate, on the other hand, have exhibited a variation in density in different areas, being extremely porous along peripheral areas. They have, therefore, exhibited an undesirable variation in properties between center and peripheral areas.

The foregoing is intended to be illustrative and not limitative of the scope of this invention which is set forth in the following claims:

What I claim is:

1. The method of making ceramic articles comprising mixing ceramic-particulate having a particle size on the order of not greater than approximately minus 200 mesh with water, a substantially water-soluble polymeric organic binder, and a substantially water-soluble compatible organic plasticizer for said binder, to form a smooth homogeneous plastic extrudable mixture by weight including between approximately 70 and 85% ceramic-particulate, extruding said mixture as a thin strip, drying said strip to a substantially water-free flexible and moldable condition, stamping said water-free flexible strip into unitary articles, and firing said articles.

2. The method of claim 1 in which the stamped articles are separated from the extruded, substantially water-free strip and fired.

3. The method of claim 1 in which the stamped articles remain clinging to the main body of the extruded, substantially water-free strip during the firing of said articles and are thereafter separated from said strip.

4. The method of making ceramic articles comprising mixing ceramic-particulate having a particle size on the order of not greater than approximately minus 200 mesh with water, a substantially water-soluble polymeric organic binder, and a substantially water-soluble compatible organic plasticizer for said binder, to form a smooth homogeneous plastic extrudable mixture by weight consisting essentially of between approximately 70 and 85% ceramic-particulate, between approximately 8 and 25% water, between approximately 1 and 10% binder, and between approximately 2 and 6% plasticizer, extruding said mixture as a thin strip, drying said strip to a substantially water-free flexible and moldable condition, stamping said water-free flexible strip into unitary articles, and firing said articles.

5. The method of claim 4 in which the stamped articles are separated from the extruded, substantially water-free strip and fired.

6. The method of claim 4 in which the stamped articles remain clinging to the main body of the extruded, substantially water-free strip during the firing thereof and are thereafter separated from said strip.

7. The method of making ceramic articles comprising mixing ceramic-particulate having a particle size on the order of not greater than approximately minus 200 mesh with water, a substantially water-soluble polymeric organic binder, and a substantially water-soluble compatible organic plasticizer for said binder, to form a smooth homogeneous plastic extrudable mixture having a viscosity between approximately $1 \times 10^6$ and $1 \times 10^{14}$ poises, said mixture by weight consisting essentially of between approximately 70 and 85% ceramic-particulate, between approximately 8 and 25% water, between approximately 0.01 and 2.0 wetting agent, between approximately 1 and 10% binder, and between approximately 2 and 6% plasticizer, extruding said mixture under pressure as a thin strip, drying said strip to a substantially water-free condition at raised temperatures below those at which said binder and plasticizer volatilize therefrom, stamping said resulting water-free flexible strip into unitary articles, and firing said articles.

8. The method of claim 7 in which the stamped articles are separated from the extruded, substantially water-free strip and fired.

9. The method of claim 7 in which the stamped articles remain clinging to the main body of the extruded, substantially water-free strip during the firing of said articles and are thereafter separated from said strip.

10. The method of claim 1 in which the polymeric organic binder is polyvinyl alcohol.

11. The method of claim 1 in which the compatible organic plasticizer is triethylene glycol.

12. The method of claim 1 in which the polymeric organic binder is polyvinyl alcohol and the compatible organic plasticizer is triethylene glycol.

References Cited in the file of this patent

UNITED STATES PATENTS

| Number | Name | Date |
|---|---|---|
| 1,131,463 | Berry | Mar. 9, 1915 |
| 1,995,791 | Bonnot | Mar. 26, 1935 |
| 2,113,717 | Brown | Apr. 12, 1938 |
| 2,346,620 | Skipper | Apr. 11, 1944 |
| 2,406,428 | Luckhaupt | Aug. 27, 1946 |
| 2,486,410 | Howatt | Nov. 1, 1949 |
| 2,524,357 | Robey | Oct. 3, 1950 |
| 2,567,592 | Ballard | Sept. 11, 1951 |
| 2,582,993 | Howatt | Jan. 22, 1952 |
| 2,593,507 | Wainer | Apr. 22, 1952 |